US009147211B2

(12) United States Patent
Catlett

(10) Patent No.: US 9,147,211 B2
(45) Date of Patent: Sep. 29, 2015

(54) SYSTEM AND METHOD FOR PROVIDING ASSISTANCE TO PURCHASE GOODS

(76) Inventor: Greg M. Catlett, Hilliard, OH (US)

(*) Notice: Subject to any disclaimer, the term of this patent is extended or adjusted under 35 U.S.C. 154(b) by 196 days.

(21) Appl. No.: 12/877,554

(22) Filed: Sep. 8, 2010

(65) Prior Publication Data

US 2011/0184833 A1  Jul. 28, 2011

Related U.S. Application Data

(60) Provisional application No. 61/240,403, filed on Sep. 8, 2009.

(51) Int. Cl.
G06Q 30/00 (2006.01)
G06Q 30/06 (2012.01)

(52) U.S. Cl.
CPC .................................. *G06Q 30/0633* (2013.01)

(58) Field of Classification Search
USPC ....................................................... 705/26, 27
See application file for complete search history.

(56) References Cited

U.S. PATENT DOCUMENTS 5,859,414 A * 1/1999 Grimes et al. ................. 235/383
5,960,440 A * 9/1999 Brenner et al. ...................... 1/1
6,587,835 B1 * 7/2003 Treyz et al. ................. 705/14.64
2003/0046188 A1 * 3/2003 Orozco ............................ 705/27
2006/0224401 A1 * 10/2006 Hunt ................................. 705/1

OTHER PUBLICATIONS

Allrecipes.com: "Allrecipes.com Keeps Folks Healthy, Organized with Nutritional Analysis, True Recipe Scaling, Automated Shopping Lists," Business Wire, Sep. 5, 2000, Dialog file 610 #00355741, 3pgs.*
Meals.com: "Meals.com is Key Ingredient for Web Sites; New Strategy Makes Meals.com Available to Millions More Worldwide," Business Wire, Jul. 26, 2000, Dialog file 610 #00330093, 3pgs.*
Predixis FoodMagic: "Predixis FoodMagic Added to Bristol Farms Web Site Helping Customers Stick to Their Diets by Suggesting Recipes That Maintain Their Taste for Great Food," PR Newswire, Feb. 11, 2004, Dialog file 20 #33791374, 3pgs.*
TimeSoft: "TimeSoft Launches FamilyTime: First Integrated Home Organization Software & Web Service Helping Parents Save Time and Money," May 4, 1999, Dialog file 20 #05187641, 3pgs.*

* cited by examiner

*Primary Examiner* — Rob Pond
(74) *Attorney, Agent, or Firm* — Porter, Wright, Morris & Arthur, LLP

(57) ABSTRACT

A system and method provides a web interface which enables consumers to select nutritious meals and easily obtain needed ingredients for the meals. The web interface provides a plurality of user selectable meals to a user, obtains a selection of at least one of the user selectable meals from the user, provides a recipe for the selected meal to the user, generates a shopping list of ingredients for the selected meal, and provide the shopping list of ingredients and a store map illustrating locations of the ingredients in a specific store to the user.

20 Claims, 14 Drawing Sheets

---

Great Mr. Smith, You Chose:

Broccoli Cheddar Chicken
Oven baked Broccoli Cheddar Chicken
With Corn and Baby Carrots.

Total Cooking and Preparation Time: 54 Minutes

The ingredients found in this recipe along with their location are as follows:

4 chicken breasts – The Butcher Shop or in the Freezer Section - $6.19 (with coupon)
1 bunch fresh broccoli – Produce Section on in Freezer Section - $5.00 Fresh or $1.50 Frozen
½ brick shredded cheddar cheese – Dairy Section - $2.50
1 can cream of mushroom soup – Aisle 7 - $1.59 (with coupon)
¾ c. mayonnaise – Aisle 4 - $2.79 (with Kroger Plus Card)
½ c. white wine (optional) – Wine Section - $5.99 and up
1 can of corn (for the side dish) – Aisle 5 - $0.79
1 bag of baby carrots (for the side dish) – Produce or in Freezer - $5.00 Fresh or $1.50 Frozen

RECIPE:
Pan boil broccoli; set aside. Boil chicken for 20 minutes. Cut Broccoli and chicken into bite size pieces. In saucepan, heat up soup, mayonnaise and wine. Layer in 9x13 inch baking pan the sauce, chicken broccoli, cheese, sauce, chicken, broccoli, remaining sauce and cheese on top. Bake at 300 degrees for 20-30 minutes or when cheese is bubbling.

[BACK]
[NEXT]

| Total Cost - | $18.86 (with frozen veggies) |
| (with coupons | $25.86 (with fresh veggies) |
| Kroger Plus Card) | optional wine not included |

[HOME] [PRINT]

HOMEPAGE

Welcome to the New Kroger Web Page

We here at the Kroger Company realize that without the loyalty of our customers we could not be here today. As you now we have always had the belief in building strong local ties and broad loyalty. The quality of our product line along with low prices is only a few of our attributes.

After reviewing all the major issues that people are currently having to deal with, we have found that it is now our duty to step up to the plate and one again lend a helping hand. Thus, we at Kroger have chosen four things that we can assist everyone with.

I. In today's economic environment, most all families, no matter how rich or poor, are on budgets. By using our new Web page, we will make it easier than ever to follow your budget.

II. Nutrition is very important for not only the body, but also the mind. By following our dietician/s recommendations you may live a healthier life style. You may also save costs on some medications that are necessary from eating an unhealthy diet.

III. Our world is hectic!! Joey has to be at soccer practice at 6:30; Sally has to be at softball at 7:00, etc. Therefore, you will have your own map to shop and save the time that can sometimes force you into the fast food syndrome.

IV. When buying a bag of potatoes, a ham, a roast, or even a pork loin, we will give you the recipes to assure that no food is wasted.

NEXT

FIG. 2

LOGIN

Please register for a Kroger Shopping Card below if you are a guest:

Name: _____
Address: _____
Phone Number: _____
Email Address: _____

If you are a returning member, please insert your Kroger Shopping card number: _____

NEXT

FIG. 3

CHOOSE YOUR STORE

Welcome Joe Smith

Below is a list of your most recent Kroger Store locations

☐ 1. 4656 Cemetery Road, Hilliard OH 43026 (614) 876-1151

☐ 2. 2525 Hilliard-Rome Road, Hilliard OH 43026 (614) 771-4174

☒ 3. 7100 Hospital drive, Dublin OH 43016 (614) 760-4241

☐ 4. 5800 W. Broad Street, Galloway OH 43119 (614) 870-4350

☐ 5. 1955 W. Henderson Rd., Upper Arlington OH 43221 (614) 457-1825

Will you be shopping at one of these stores, or a new location?

If you would like a new location please enter the zip code and we will locate the closest stores within a 20 mile radius

[HOME] [NEXT]

FIG. 4

MAIN MENU

Please check one

☐ Items Currently on Sale
☐ New Items at your Kroger Store
☐ National Coupons
☐ Kroger Saving Coupons
☒ Family Friendly Meals
☐ Don't Waste your Food

BACK
NEXT
HOME

FIG. 5

FAMILY FRIENDLY MEALS

How many people will you be cooking for?

- ☐ 1
- ☐ 2
- ☐ 3
- ☒ 4
- ☐ 5
- ☐ 6
- ☐ 7
- ☐ 8
- ☐ 9
- ☐ 10

How much money do you like to spend per person?

- ☐ $2.00 - $3.00
- ☐ $3.00 - $4.00
- ☒ $4.00 - $5.00
- ☐ $5.00 - $6.00
- ☐ $6.00 - $7.00
- ☐ $7.00 - $8.00
- ☐ $8.00 - $9.00
- ☐ $9.00 - $10.00

List recipes per

- ☒ Lowest to Highest Cost
- ☐ Minimum to Maximum Time
- ☐ Food Category

BACK  NEXT  HOME

FIG. 6

Chicken and Rice
Chicken tenderloins simmered in a hearty mushroom gravy served on top of a bed of seasoned Rice along with green beans and baby carrots. Total Time: 45 Minutes. Nutrition Facts: serving size 1, recipe makes 4 servings; Calories 707, Cholesterol 177 mg, Sodium 1301 mg, Potassium 587 mg, Total Carbohydrates 22.8g, Protein 53 g.

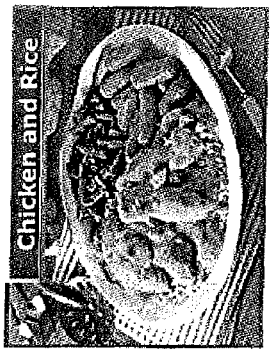

Homestyle Chicken ®
Two boneless chicken breasts hand dipped in fresh buttermilk, breaded and deep fried to a golden brown with mashed potatoes and Green Beans. Total Time: 46 Minutes. Nutrition Facts: serving size 1, recipe makes 4 servings; Calories 707, Cholesterol 177 mg, Sodium 1303 mg, Potassium 587 mg, Total Carbohydrates 22.8g, Protein 53 g.

Page 1 of 3

HOME  FWD  BACK

FIG. 7

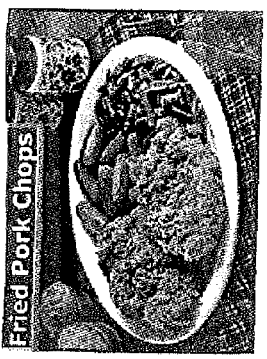

Fried Pork Chops
You can enjoy two hand-dipped and battered Fried Pork Chops along with green beans and baby carrots. Total Time: 45 Minutes. Nutrition Facts: serving size 1, recipe makes 4 servings; Calories 707, Cholesterol 177 mg, Sodium 1303 mg, Potassium 587 mg, Total Carbohydrates 22.8g, Protein 53 g.

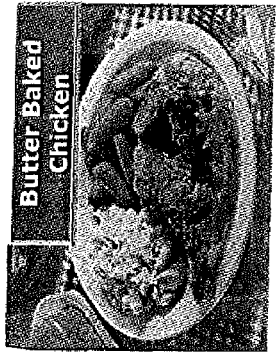

Butter Baked Chicken
Lightly seasoned Butter Baked Chicken in a rich buttery sauce with Mashed Potatoes and Baby Carrots. Total Time: 55 Minutes. Nutrition Facts: serving size 1, recipe makes 4 servings; Calories 707, Cholesterol 177 mg, Sodium 1303 mg, Potassium 587 mg, Total Carbohydrates 22.8g, Protein 53 g.

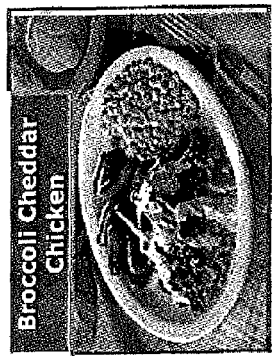

Broccoli Cheddar Chicken
Oven baked Broccoli Cheddar Chicken with Corn and Baby Carrots. Total Time: 54 Minutes. Nutrition Facts: serving size 1, recipe makes 4 servings; Calories 707, Cholesterol 177 mg, Sodium 1303 mg, Potassium 587 mg, Total Carbohydrates 22.8g, Protein 53 g.

Page 2 of 3

[HOME] [FWD] [BACK]

FIG. 8

Turkey and Dressing
Roasted Turkey and Dressing with Green Beans and Baby Carrots. Total Time: 52 Minutes. Nutrition Facts: serving size 1, recipe makes 4 servings; Calories 707, Cholesterol 177 mg, Sodium 1303 mg, Potassium 587 mg, Total Carbohydrates 22.8g, Protein 53 g.

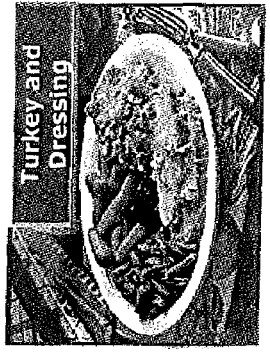

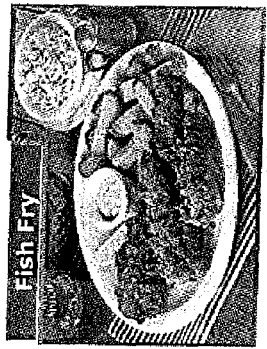

Fish Fry
Four Cod fillets hand-dipped in a special batter and fired to a golden brown with Steak Fries and Cole Slaw. Total Time: 35 Minutes. Nutrition Facts: serving size 1, recipe makes 4 servings; Calories 707, Cholesterol 177 mg, Sodium 1303 mg, Potassium 587 mg, Total Carbohydrates 22.8g, Protein 53 g.

Page 3 of 3

HOME  FWD  BACK

FIG. 9

Great Mr. Smith, You Chose:

Broccoli Cheddar Chicken
Oven baked Broccoli Cheddar Chicken
With Corn and Baby Carrots.

Total Cooking and Preparation Time: 54 Minutes

The ingredients found in this recipe along with their location are as follows:

4 chicken breasts – The Butcher Shop or in the Freezer Section - $6.19 (with coupon)
1 bunch fresh broccoli – Produce Section on in Freezer Section - $5.00 Fresh or $1.50 Frozen
½ brick shredded cheddar cheese – Dairy Section – $2.50
1 can cream of mushroom soup – Aisle 7 - $1.59 (with coupon)
¾ c. mayonnaise – Aisle 4 - $2.79 (with Kroger Plus Card)
½ c. white wine (optional) – Wine Section - $5.99 and up
1 can of corn (for the side dish) – Aisle 5 - $0.79
1 bag of baby carrots (for the side dish) – Produce or in Freezer - $5.00 Fresh or $1.50 Frozen

RECIPE:

Pan boil broccoli; set aside. Boil chicken for 20 minutes. Cut Broccoli and chicken into bite size pieces. In saucepan, heat up soup, mayonnaise and wine. Layer in 9x13 inch baking pan the sauce, chicken broccoli, cheese, sauce, chicken, broccoli, remaining sauce and cheese on top. Bake at 300 degrees for 20-30 minutes or when cheese is bubbling.

| Total Cost - | $18.86 (with frozen veggies) |
|---|---|
| (with coupons | $25.86 (with fresh veggies) |
| Kroger Plus Card) | optional wine not included |

BACK  NEXT  PRINT  HOME

FIG. 10

NUTRITION FACTS:

Broccoli Cheddar Chicken

Serving Size 1 (370g)
Recipe makes 4 servings

Calories 707
Calories from fat 407 (57%)

Amount Per Serving %DV
Total Fat 45.2g 69%
Saturated Fat 16.7g 83%
Monounsaturated Fat 12.6g
Polyunsaturated Fat 13.2g
Trans Fat 0.0g
Cholesterol 177mg 59%
Sodium 1303mg 54%
Potassium 587mg 16%
Total Carbohydrate 22.8g 7%
Dietary fiber 2.9g 11%
Sugars 6.0g
Protein 53.0g 106%

ATTACH TO CARD
BACK
NEXT
PRINT

HOME

FIG. 11

NATIONAL AND KROGER COUPONS

Kroger Coupon
Save $1.00
On any Butcher
Sop Purchase of
$7.00 or more
Expires 9/20/10 ||||||||||||

Campbell's Soup
save $0.25
On any can of soup

Expires 12/31/10 ||||||||||||

BACK
NEXT
PRINT

HOME

FIG. 12

ADDITIONAL ITEMS

Will there be any other items that you will be purchasing today?

☐ Baked Goods
☐ Beer & Wine
☐ Dairy Products
☐ Deli Items
☐ Drinks
☐ Fresh Produce
☐ Frozen Foods
☐ Meat & Cheese
☐ Pharmacy Products

BACK
NEXT
RETURN TO MEAL SEARCH
HOME

FIG. 13

KROGER MAP
Store Location: 7100 Hospital Drive, Dublin OH 43016

| FRESH PRODUCE | BUTCHER SHOP | | | | | | | | | | | | | | | | | | | | | shredded cheddar cheese ☒ 2 cups $2.50 | DAIRY |
|---|---|---|---|---|---|---|---|---|---|---|---|---|---|---|---|---|---|---|---|---|---|---|---|

☒ 4 chicken breasts $8.19 (with coupon)

1  2   3 4   5 6   7 8   9 10   11 12   13 14   15 16   17 18   19 20   21 22   23 24

☒ fresh broccoli
3 for $5.00

☒ Fresh baby carrots
1 lb. 3 for $5.00

☒ canned corn
1 can $0.79

☒ mushroom soup
1 can $1.59
(with coupon)

☒ Frozen broccoli
12 oz. $1.50

☒ Frozen baby carrots
12 oz. $1.50

BAKERY

Salad Bar

☒ Mayonnaise
1 jar $2.79
(with Plus card)

DELI      Sushi

☒ white wine
Wine   1 bottle $5.99 and up

PIZZA     COFFEE

CHECK OUT

BREAD

Entrance                                                              Entrance       Pharmacy

[HOME] [BACK] [NEXT] [PRINT]

FIG. 14

SYSTEM AND METHOD FOR PROVIDING ASSISTANCE TO PURCHASE GOODS

CROSS-REFERENCE TO RELATED APPLICATIONS

This application claims the priority of U.S. Provisional Patent Application No. 61/240,403 filed on Sep. 8, 2009, the disclosure of which is expressly incorporated herein in its entirety by reference.

STATEMENT REGARDING FEDERALLY SPONSORED RESEARCH

Not Applicable

JOINT RESEARCH AGREEMENT

Not Applicable

REFERENCE TO APPENDIX

Not Applicable

FIELD OF THE INVENTION

The field of the present invention generally relates to systems and methods which assist in the purchase of goods and, more particularly, to such systems and methods which identify goods needed for a specific purpose, availability of the goods at a specific store location, cost of the goods, and/or location of the goods within the specific store location.

BACKGROUND OF THE INVENTION

Our world to day is hectic. As a result, families are frequently forced to eating fast food or other types of carry out food or prepared food in order to fit dinner into their schedules. However, eating in such a manner can be very unhealthy. Nutrition is very important for not only the body, but also the mind. People can live a healthier life style by following a dietician's recommendations. Such a healthy life style may also save costs on some medications that are necessary from eating an unhealthy diet.

In today's economic environment, most families, no matter how rich or poor, are on budgets. Unfortunately, it is difficult to stay within a budget when considering nutrition or time. It is even more difficult when considering both time and nutrition. Accordingly, there is a need for improved systems and methods for providing assistance to families for purchasing nutritious food that is obtained in a desired time period and is within a desired budget.

SUMMARY OF THE INVENTION

The present invention provides a system and method that overcomes at least some of the issues of the related art. Disclosed is a system comprising, in combination, a memory configured to store computer executable instructions and a processor in communication with the memory, wherein the processor is configured to execute the computer executable instructions. The instructions provide a plurality of user selectable meals to a user, obtain a selection of at least one of the user selectable meals from the user, provide a recipe for the selected meal to the user, generate a shopping list of ingredients for the selected meal, and provide the shopping list of ingredients and a store map illustrating locations of the ingredients in a specific store to the user.

Also disclosed is a computer program embodied on a computer readable medium comprising, in combination computer executable instructions create a web interface. The web interface provides a plurality of user selectable meals to a user, obtains a selection of at least one of the user selectable meals from the user, provides a recipe for the selected meal to the user, generates a shopping list of ingredients for the selected meal, and provides the shopping list and a store map illustrating locations of the ingredients in a specific store to the user.

Further disclosed is a computer implemented method comprising the steps of, in combination, providing a plurality of user selectable meals to a user via a web interface coupled to a network, obtaining a selection of at least one of the user selectable meals from a user via the web interface, providing a recipe for the selected meal to the user via the web interface, generating a shopping list of ingredients for the selected meal, and providing the shopping list and a store map illustrating locations of the ingredients in a specific store to the user via the web interface.

From the foregoing disclosure and the following more detailed description of various preferred embodiments it will be apparent to those skilled in the art that the present invention provides a significant advance in the technology of systems and methods for purchasing goods. Particularly significant in this regard is the potential the invention affords for providing an, reliable, effective, and convenient system and method for purchasing goods. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein:

FIG. 2 is a diagrammatic view of a homepage of the system of FIG. 1;

FIG. 3 is a diagrammatic view of a login page of the system of FIG. 1;

FIG. 4 is a diagrammatic view of a store selection page of the system of FIG. 1;

FIG. 5 is a diagrammatic view of a main menu page of the system of FIG. 1;

FIG. 6 is a diagrammatic view of a meal search page of the system of FIG. 1;

FIGS. 7 to 9 are diagrammatic views of meal selection pages of the system of FIG. 1;

FIG. 10 is a diagrammatic view of a meal summary page of the system of FIG. 1;

FIG. 11 is a diagrammatic view of a meal nutrition page of the system of FIG. 1;

FIG. 12 is a diagrammatic view of a coupon page of the system of FIG. 1;

FIG. 13 is a diagrammatic view of an additional items page of the system of FIG. 1; and FIG. 14 is a diagrammatic view of a store map page of the system of FIG. 1.

Figure 1:
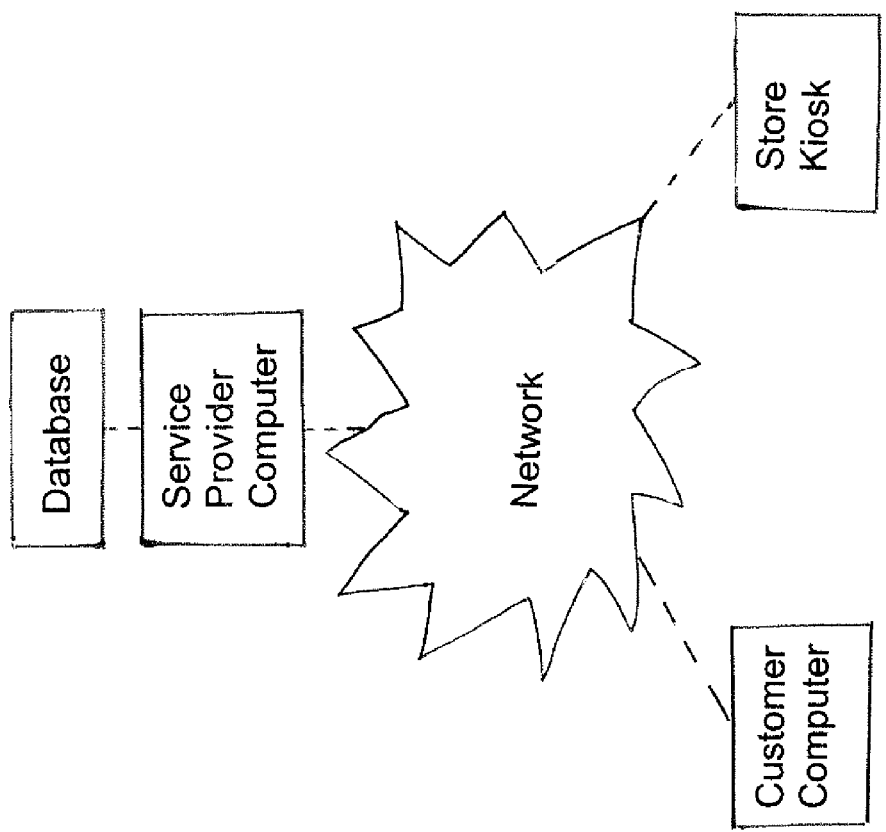
FIG. 1 is a diagrammatic view of a system according to the present invention.

It should be understood that the appended drawings are not necessarily to scale, presenting a somewhat simplified representation of various preferred features illustrative of the basic principles of the invention. The specific design features of the systems and methods as disclosed herein, including, for example, specific dimensions, orientations, locations, and shapes will be determined in part by the particular intended application and use environment.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved system and methods disclosed herein. The following detailed discussion of various alternative and preferred embodiments will illustrate the general principles of the invention with reference to a system and method that provides assistance to consumers in selecting nutritious meals and purchasing groceries for those meals. Other embodiments suitable for other applications will be apparent to those skilled in the art given the benefit of this disclosure.

Referring now to the drawings, FIG. 1 illustrates an exemplary system 10 for providing assistance to a consumer to select nutritious meals having available ingredients and purchase groceries for the meals according to the present invention. The illustrated system 10 includes a service provider computer 12 programmed with software on a computer readable medium to create a web interface to facilitate interaction with consumers as described in more detail hereinafter. A web interface source code segment facilitates presentation of content to users that access the web interface and allows reception of data provided by the users that interface with the system 10.

The service provider computer 12 can include a processing unit, a system memory, and a system bus that couples various system components including the system memory to the processing unit. The processing unit can be any of various commercially available processors. Dual microprocessors and other multi-processor architectures also can be used as the processing unit. The computer memory includes read only memory (ROM) and random access memory (RAM). A basic input/output system (BIOS), containing the basic routines that help to transfer information between elements within the computer, such as during start-up, is stored in ROM. The system bus can be any of several types of bus structure including a memory bus or memory controller, a peripheral bus, and a local bus using any of a variety of commercially available bus architectures.

The service provider computer 12 can further include a hard disk drive, a magnetic disk drive, e.g., to read from or write to a removable disk, and an optical disk drive, e.g., for reading a CD-ROM disk or to read from or write to other optical media. The service provider computer 12 typically includes at least some form of computer readable media. Computer readable media can be any available media that can be accessed by the computer 12. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above can also be included within the scope of computer readable media.

A number of program modules may be stored in the drives and RAM, including an operating system, one or more application programs, other program modules, and program non-interrupt data. The operating system in the computer 12 can be any of a number of commercially available operating systems. The operating system may be, but is not limited to, Microsoft Windows®, Apple OSX™, Linux, Unix, a mainframe operating system, a mobile device operating system such as Android™, or the like.

A user may enter commands and information into the computer 12 through a keyboard and a pointing device, such as a mouse. Other input devices may include a microphone, an IR remote control, a joystick, a game pad, a satellite dish, a scanner, or the like. These and other input devices are often connected to the processing unit through a serial port interface (not shown) that is coupled to the system bus, but may be connected by other interfaces, such as a parallel port, a game port, a universal serial bus ("USB"), an IR interface, etc.

A monitor, or other type of display device, is also preferably connected to the system bus via an interface, such as a video adapter. In addition to the monitor, the computer 12 typically includes other peripheral output devices, such as speakers, printers etc. The monitor can be employed with the computer 12 to present data that is electronically received from one or more disparate sources. For example, the monitor can be an LCD, plasma, CRT, etc. type that presents data electronically. Alternatively or in addition, the monitor can display received data in a hard copy format such as a printer, facsimile, plotter etc. The monitor can present data in any color and can receive data from the computer 12 via any wireless or hard wire protocol and/or standard.

The service provider computer 12 can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet. When used in a LAN networking environment, the computer is connected to the local network through a network interface or adapter. When used in a WAN networking environment, the computer 12 typically includes a modem, or is connected to a communications server on the LAN, or has other means for establishing communications over the WAN, such as the Internet. In a networked environment, program modules depicted relative to the computer 12, or portions thereof, may be stored in the remote memory storage device. It will be appreciated that network connections described herein are exemplary and other means of establishing a communications link between the computers may be used.

The service provider computer 12 can be in communication with one or more databases 14 storing information used to carry out the system and method according to the present invention. The information can include, but is not limited to, consumer loyalty card information, store location information, recipe information, store inventory information, product price information, coupon information product location information, store mapping information, and/or the like. The service provider computer 12 can be in communication with the database(s) 14 via any suitable means such as a direct wired or wireless connection, a wide area network, a local area network, the Internet, or the like. Alternatively, one or more of the databases 14 can reside within the service provider computer.

The illustrated service provider computer 12 illustrates one possible hardware configuration to support the systems and methods described herein, including the system 10 above. It is to be appreciated that although a standalone architecture is illustrated, that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

Consumers can access the web interface of the system 10 via a computer 16 communicating with the service provider computer 12. The consumer computer 16 can be of any suitable type processor-driven device such as, but not limited to, computers similar to the service provider computer 12, general purpose desktop computers, laptops, mobile devices such as tablet computers and smart phones, and the like. The web interface of the system 10 allows the consumer computer 16 to access the system 10 using any suitable network 18 such as, for example, a wide, area network, a local area network, the Internet, or the like via a wireless or wired connection. Consumers can alternatively access the system 10 from kiosks 20 located in grocery stores and/or any suitable publicly accessible location. The kiosks 18 can comprise any suitable type processor-driven device such as, but not limited to, computers similar to the service provider computer 12, general purpose desktop computers, laptops, mobile devices such as tablet computers and smart phones, and the like. The kiosks 20 can access the system 10 using any suitable network 16 such as, for example, a wide, area network, a local area network, the Internet, or the like via a wireless or wired connection.

The system 10 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in and described with respect to FIG. 1.

FIGS. 2 to 14, illustrate several computer screen images or web pages generated by the web interface of the system 10. The illustrated computer screen images show an exemplary transaction between a consumer and the system 10. It is noted that a transaction can include a greater or fewer number of web pages. It is also noted that a transaction can include any other suitable web pages.

FIG. 2 illustrates an exemplary homepage which can provide general information to the consumer. The illustrated home page provides a brief description of the web site. It is noted that any other suitable information can be provided on the homepage or the homepage can be eliminated.

FIG. 3 illustrates an exemplary login page for either new or returning customers. The web interface software includes a registration component new users and an authentication component for registered customers. The registration component allows a user to create a new account for access to the system 10. The account information can be specific to the particular user. Specific information related to each user type can be entered into preset fields including an email address contact. Once this information is entered, the email address can be checked against email addresses associated with current members to determine if an account already exists with the same contact information. If it is determined that the email address already exists, a notification can be provided to the user and/or the user can be directed to log in using the current email address. In contrast if the email address is not found within the system 10, a member agreement can be presented for acceptance by the user, a user account ID can be created and saved to the system 10 to facilitate subsequent log in by the user. If desired, a user password can also be created. In the illustrated embodiment, the user ID is an account number associated with a shopping card, customer loyalty card, or the like for a specific grocery store chain. Once registered, the shopping card will be sent to the customer at the provided mailing address.

The authentication component is employed to access the system 10 via a previously created user ID which in the illustrated embodiment is the shopping card number (and the user password if utilized). The authentication component can verify the user ID (and the user password if utilized) is valid and/or that the user ID exists within the system 10. Once the appropriate user ID (and use password if utilized) has been entered, the authentication component can allow a user to access information specific to their own account and/or to proceed, as appropriate. It is to be appreciated that additional verification techniques can be employed to maintain the security of the system 10 from unwanted users. If the user ID is not found in the database, the user is given the option to register. In this scenario, the authentication component can redirect the user to the registration component to facilitate registration thereof. Once authentication has passed, access to the system is facilitated.

FIG. 4 illustrates an exemplary store selection page wherein a list of specific grocery store locations is provided in which the consumer has most recently utilized using their shopping card. Additionally, the consumer can search for new locations by entering a zip code. Alternatively or additionally, the store selection page can identify the closest stores based on the consumers IP address from which they are accessing the system 10 or the mailing address of record for their account. It is noted, that when accessing the system 10 from a kiosk 20 located in a grocery store, the store selection page will additionally or alternatively identify the kiosk's store as a selection. Preferably, the kiosk's store is provided as the default store location with the option to select a different store location.

FIG. 5 illustrates an exemplary main menu page of the system 10. The illustrated main menu page provides the consumer the ability to select form a plurality of different types of information which is available. The illustrated options include items currently on sale at the selected store location, new products now available at the selected store location, manufacturer coupons that are currently available, store specific coupons available for the selected store location, recipes meeting certain family requirements or "Family Friendly Meals", and recipes that utilize specific food that is available. If the family friendly meals option is selected, the consumer is taken to a meal search page.

FIG. 6 illustrates an exemplary meal search page of the system 10. The illustrated meal search page enables the consumer to identify the number of people who will be eating the meal and the desired amount of money to be spent per person for the email. Alternatively, the consumer can be asked the number of persons and the total budget for the meal. Also, the consumer can alternatively be given the option to limit the meal to certain food categories. The illustrated meal selection page also provides the consumer options for presentation of suggested recipes such as, for example, lowest to highest cost, minimum to maximum preparation time, food category, or the like. It is noted that any other suitable presentation form can alternatively be utilized. Once the information is entered by the consumer, the consumer is taken to meal selection pages.

FIGS. 7 to 9 illustrates exemplary meal selection pages of the system 10. The illustrated meal selection pages provide a plurality of nutritious meals which meets the criteria provided by the consumer and which have ingredients available at the selected store location. That is, the suggested meals change as the inventory of groceries at the selected store location changes. The illustrated meal selection pages identify the suggested meals by title, brief description, preparation time, and nutrition facts. It is noted that additional and/or alternative information can alternatively be provided such as, for example, total meal cost and/or some of the illustrated information can alternatively be eliminated. Once a meal is selected, the consumer is taken to a meal summary page.

FIG. 10 illustrates an exemplary meal summary page of the system 10. The illustrated meal summary page provides the consumer with the meal title, meal brief description, meal preparation time, an ingredient list with ingredient location within the store and ingredient cost, a recipe for the meal, and the total cost for the meal at the selected store location. The total cost preferably provides the consumer with the exact amount that will be needed out of pocket to purchase items to prepare the meal taking into account the ingredient sizes necessary and available, any available store or manufacturer coupons, and any preferred shopper discounts. It is noted that additional and/or alternative information can alternatively be provided and/or some of the illustrated information can alternatively be eliminated. The consumer can preferably print the meal summary page if desired. The consumer can also preferably save the summary page for later access if desired. The consumer is next taken to a nutrition page.

FIG. 11 illustrates an exemplary meal nutrition page of the system 10. The illustrated meal nutrition page provides nutrition facts for the selected meal. It is noted that additional and/or alternative information can alternatively be provided and/or some of the illustrated information can alternatively be eliminated. The consumer can preferably print the meal nutrition page. The consumer can also preferably save the meal nutrition page for later access if desired. The consumer is next taken to a coupon page.

FIG. 12 illustrates an exemplary coupon page of the system 10. The illustrated coupon page provides store and manufacturer coupons that are available for the ingredients of the selected meal and taken into account in the identified total price for the selected meal. It is noted that other coupons can be provided if desired in order to highlight current promotions and/or encourage additional purchases. The consumer can print the coupon page and/or have the coupons electronically attached to their shopping card account for access at the store via the store shopping card. The consumer is next taken to a store map page.

FIG. 13 illustrates an exemplary additional items page of the system 10. The illustrated additional items page provides the customer with the opportunity to add additional items to their shopping list. If the customer desires to additional individual items, the customer can select from the list of food categories. Once the customer selects a category, the category expands to provide a list of available products in that category. Once all desired individual products are selected, the individual items are added to the customer's shopping list and the customer's store map. Additionally, an individual item summary page can be obtained and printed or saved which provides a shopping list with individual prices and store locations and a total cost similar to the meal summary page described above. If the customer desires to add additional meals, the customer can select to return to the meal search page. Preferably, the customer can be presented with meals that utilize unused portions of ingredients needed to be purchased for previously selected meals. Once a meal is selected it will have its own meal summary and meal nutrition pages but the additional meal items are added to the same shopping list and same store map page. When the customer does not desire any additional individual items or meals, the customer can proceed the store map page.

FIG. 14 illustrates an exemplary store map page of the system. The illustrated store map page provides a map of the selected grocery store which identifies the location, quantity, and cost of each of the ingredients for the selected meal. It is noted that the map can also include brand information if desired. The consumer can preferably print the store map page. The consumer can also preferably save the store map page for later access if desired. Next the consumer is given the option to exit or return to main menu page. Once the consumer exits the system, they can take the printed sheets and purchase the items by following the map and ingredient list and then prepare the meal using the recipe and purchased ingredients. It is noted that if the customer has a mobile device such as, for example, a smart phone or the like, saved information such as the shopping list or the store map can be accessed at the store using their mobile device.

One skilled in the art will appreciate that many variations can be made to the above illustrated system and method. It will also be appreciated that the above illustrated system and method provides assistance to families for purchasing nutritious food that is obtained in a desired time period and is within a desired budget. It will be further appreciated that the above illustrated system and method provides assistance to families to reduce waste by suggesting meals which utilize ingredients that may otherwise go unused.

From the foregoing disclosure and detailed description of certain preferred embodiments, it will be apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. Computer program code embodied on a non-transitory computer readable medium for generating a shopping list, said program code executed by a processor causing the processor to:
   provide a plurality of user selectable meals to a user via a web interface coupled to a network;
   receive a selection of at least one of the user selectable meals from a user via the web interface;
   present to the user additional user selectable meals that utilize unused portions of ingredients required by the at least one user selectable meal;

provide a recipe for each of the selected user selectable meals to the user via the web interface;
automatically generate a shopping list of ingredients for each of the selected user selectable meals;
provide a separate total cost for purchasing the ingredients of each of the selected user selectable meals at a specific store; and
provide the shopping list and a store map illustrating locations of the ingredients within an interior of the specific store to the user via the web interface, wherein the store map identifies the location, quantity, and cost for each of the ingredients for the selected user selectable meals at the specific store.

2. The computer program code according to claim 1 wherein the plurality of user selectable meals are generated based on user provided criteria.

3. The computer program code according to claim 2, wherein the user provided criteria includes a maximum total cost for each of the user selectable meals.

4. The computer program code according to claim 2 wherein the user provided criteria includes a number of persons eating the meal.

5. The computer program code according to claim 1 wherein the plurality of user selectable meals are generated based on previously selected meals.

6. The computer program code according to claim 1 wherein the web interface further provides preparation time for each of the selected user selectable meals to the user.

7. The computer program code according to claim 1 wherein the web interface further obtains a user selection of the specific store from the user.

8. A computer implemented method for generating a shopping list, the method comprising:
providing a plurality of user selectable meals to a user via a web interface coupled to a network;
receiving a selection of at least one of the user selectable meals from a user via the web interface;
presenting to the user additional user selectable meals that utilize unused portions of ingredients required by the at least one user selectable meal;
providing a recipe for each of the selected user selectable meals to the user via the web interface;
automatically generating a shopping list of ingredients for each of the selected user selectable meals;
providing a separate total cost for purchasing the ingredients of each of the selected user selectable meals at a specific store; and
providing the shopping list and a store map illustrating locations of the ingredients within an interior of the specific store to the user via the web interface, wherein the store map identifies the location, quantity, and cost for each of the ingredients for the selected user selectable meals at the specific store.

9. The method according to claim 8, wherein the plurality of user selectable meals are generated based on user provided criteria.

10. The method according to claim 9, wherein the user provided criteria includes a maximum total cost for each of the user selectable meals.

11. The method according to claim 9, wherein the user provided criteria includes a number of persons eating the meal.

12. The method according to claim 8, wherein the plurality of user selectable meals are generated based on previously selected meals.

13. The method according to claim 8, further comprising the step of obtaining a user selection of the specific store.

14. The method according to claim 8, further comprising the step of providing a preparation time for each of the selected meal user selectable meals to the user.

15. A computer implemented method for generating a shopping list, the method comprising:
providing a plurality of user selectable processes each requiring a plurality of purchased goods to perform to a user via a web interface coupled to a network;
receiving a selection of at least one of the user selectable processes from a user via the web interface;
presenting to the user additional user selectable processes that utilize unused portions of goods required by the at least one user selectable process;
providing a list of instructions for each of the selected user selectable processes to the user via the web interface;
automatically generating a shopping list of required goods for each of the selected user selectable processes;
providing a separate total cost for purchasing the required goods of each of the selected user selectable processes at a specific store; and
providing the shopping list and a store map illustrating locations of each of the plurality of required goods within an interior of a the specific store to the user via the web interface, wherein the store map identifies the location, quantity, and cost for each of the required goods for the selected user selectable processes at the specific store.

16. The method according to claim 15, wherein the plurality of user selectable processes are generated based on user provided criteria.

17. The method according to claim 15, wherein the plurality of user selectable processes are generated based on previously selected processes.

18. The method according to claim 15, wherein the plurality of user selectable processes are generated based on users provided criteria and wherein the user provided criteria includes a maximum total cost for each of the user selectable processes.

19. The method according to claim 15, further comprising the step of obtaining a user selection of the specific store.

20. The method according to claim 15, further comprising the step of providing a total time for performing each of the selected user selectable processes to the user.

* * * * *